Feb. 29, 1944.    L. J. HEBERT    2,343,010
GREENHOUSE EQUIPMENT
Filed April 13, 1942
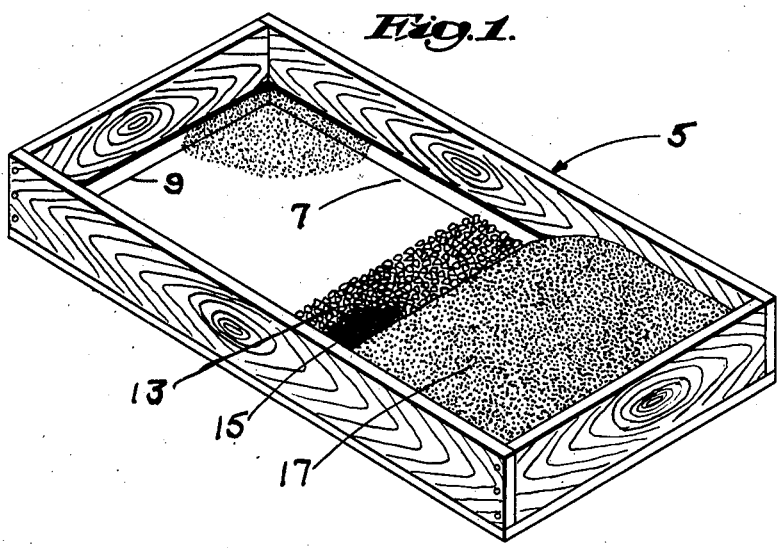
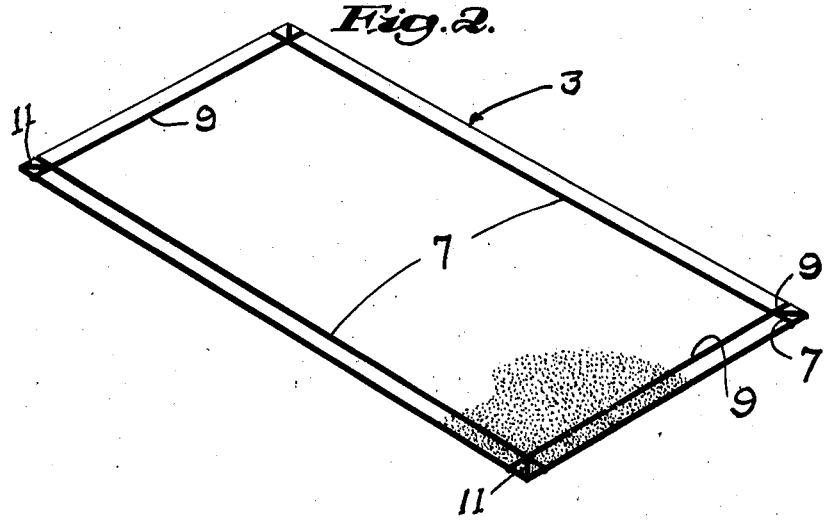
Inventor:
Leo J. Hebert
By H. L. Kirkpatrick
Attorney Patented Feb. 29, 1944

2,343,010

UNITED STATES PATENT OFFICE 2,343,010

GREENHOUSE EQUIPMENT

Leo J. Hebert, East Saugus, Mass., assignor to Bird & Son, inc., East Walpole, Mass., a corporation of Massachusetts Application April 13, 1942, Serial No. 438,669

4 Claims. (Cl. 47—38)

This invention relates to greenhouse equipment and has for its object to provide an improved and novel greenhouse flat and insert combination which affords many advantages and savings in connection with the germination of seeds, and the growing and maintenance of small plants.

Greenhouse flats are small wooden trays used in large numbers by greenhouses, and such trays are made of any common soft wood stock, for example, relatively thin pine or cypress. These trays are made in various standard sizes, the dimensions of which are usually about twelve or fourteen inches wide by eighteen, twenty or twenty-four inches long, and with walls three or four inches high. In such trays the soil is placed and seeds, cuttings, seedlings, and small plants, as the case may be, are grown, the watering of which is almost invariably done from the top. Since the trays are both absorbent and not watertight, a good deal of the water is wasted through joints and cracks in the flat, and frequent watering is required. Moreover, top-watering must be carefully and slowly done in order to distribute water to all of the plants, and some plants, e. g. calceolaria and begonias, are even damaged or rotted by such top-watering. In any event, it is difficult and troublesome to keep either seeds or plants uniformly or correctly watered and considerable losses of both ensue. Also, top-watering, at best, tends to be messy since it must be done by light sprinkling, and due to this and leaky flats, the flats cannot be placed and watered in tiers or in racks above other plants since the latter would be soiled and rendered unattractive for sales purposes.

The present invention avoids the foregoing disadvantages, and affords many advantages and savings in equipment, time and plants by reason of the novel flat and insert combination of this invention, as will more fully hereinafter appear from the description and drawing.

In the drawing:

Fig. 1 is a perspective view of the novel flat and insert combination of this invention but with only a part of the gravel, sand and soil in place in the flat; and Fig. 2 is a perspective view of the flexible insert as made and prior to being folded, placed and held in the flat as illustrated in Fig. 1.

Referring to the drawing in which like numerals represent like parts—the insert of Fig. 2, generally designated 3, is made preferably from an absorbent saturating paper of about .020–.025" caliper saturated with a low melting point asphalt (110–140° F.) to the extent of 130–140% by weight of the paper base, and after saturation, is thinly coated on both sides with a high melting point asphalt (240°–275° F.) so that there is thus provided a tough, flexible waterproof material. This is then cut to dimensions approximately one to one-and-a-half inches larger in over-all length and width than the inside bottom dimensions of the wooden flat, generally designated 5. The flexible waterproofed material is then creased by longitudinal creases 7, and transverse creases 9, with diagonal folding creases 11 at each corner to facilitate forming and placing of the insert in the flat 5. The rectangle formed between the creases 7 and 9 is but slightly smaller than the inside bottom dimensions of the flat so that upon folding on these creases, together with the forming of the corners by bending on the creases 11, the insert may be placed in the bottom of the flat where it then serves to provide a water-retaining bottom portion with side portions extending but slightly and partially up the inside walls of the wooden flat from the bottom thereof, say, up one-half to three-quarters of an inch, or thereabouts. In this way, the danger of over-watering or top-watering is eliminated because the flats cannot be filled with water above the top edge of the insert. Best practice in the use of flat and insert combination involves first placing therein a layer of gravel 13 to which may be added a layer of sand 15, and then the thicker layer of seed soil 17, the latter, however, preferably not extending up as far as the top edge of the flat 5, as appears from Fig. 1 of the drawing.

By use of my novel combination as thus described, I am able to secure results not previously possible in the growing of plants in flats. It has been found in actual practice that a thorough watering, which may be done either before or after the seed soil is in place (as at one corner through, if desired, a glass watering tube or small clay thumb pot may be inserted), will usually keep the ground moist in the bottom zone and the seeds moist by capillary until germination takes place. The watering of ordinary wood plant flats is, as has been previously referred to, not only costly but unsatisfactory. During the warm spring months ordinary wooden flats dry out so rapidly that it may require four or five waterings per day to prevent the roots from drying out and, further, it is very difficult to know when the earth is in a properly moist condition without disturbing the earth, consequently the roots of the plants, which would result in setting them back, delaying growth.

Very frequently the top of the earth may appear moist and the bottom of the flat may be dried out, due to the contact of earth with wood, which draws away the moisture. On the other hand, excessive watering of seeds and small plants washes away the earth to such an extent that an appreciable loss results. Over the methods ordinarily required in watering flats I am able to save 60 to 80% of the labor involved. Because of the problems of watering there has resulted a very distinct interest in methods of watering from beneath. Some of these methods involve the use of a wick to draw the water from a pail or other container up into the ground. These methods are not satisfactory as the moisture is not uniform, there not being sufficient moisture between wicks, and, further, the water containers and wicks have to be kept clean at all times, and this involves considerable labor. With the use of my inserts I am able to maintain such a uniform and continually moist condition as to germinate seeds and produce seedlings with one watering.

By the use of my inserts I am able to plan in advance the moisture condition which will be most suitable for the seeds or seedlings to be grown. I do this by the use of broken stone or pebbles placed as a bottom course in the flats. This drainage material placed in the flats will control the amount of moisture in the earth, and this cannot be done by watering from the top or by the wick method of supplying moisture from the bottom.

Different plant seeds require different moisture conditions and for the best results the proper moisture condition must be maintained, and this I am able to do. I have found by this combination of flats with my insert that I can not only secure results not previously obtained, but with less time and expense.

I have found that the use of my inserts enables me to obtain approximately 40% additional greenhouse space than has been previously possible. Due to the use of these inserts in the flats I am able to place rows of these flats on pipe racks above the regular greenhouse beds and at the same time I am able to carry on the full production of blooming plants in the beds. This is due to the fact that water does not seep away from the earth in the plants and drip onto the blooms which are beneath, consequently soiling and making them unsalable. The very much reduced amount of water required in the flats not only accomplishes this but there is no leakage from the flats. This is a very important point, for records show that greenhouse men over a period of years are not receiving for their product a return in proportion to the increasing expense involved in running the greenhouses; in other words, the cost per square for the greenhouse, and the returns, are diminishing. By the use of these inserts in flats I am able to increase the available space very substantially with relatively small increase in equipment and labor.

Another feature which is obtained by the use of these inserts in the flats is the longer life of the flats. Ordinary flats will wear out and require considerable replacement from year to year, due to the softening action of water on the woodwork, rotting out of the wood etc. By the use of my inserts I am able to increase the life of the flats two, three, or even four times.

My inserts could be made of any desirable rust-resistant material; however, I have found an asphalted sheet of paper or felt entirely satisfactory, and I prefer the insert to be asphalt-saturated and coated, because of its economy in first cost, and I find it sufficiently long-lived. Also, in the course of its manufacture, such asphalt-saturated material is sterilized, an important advantage. There are other advantages in the combination of my insert in flats, which I will mention as follows:

For the pinching-out period, by planting in flats thus equipped with my insert, space and amount of watering are saved with much better results secured. Further, for displaying potted plants, a clean flat may be used and the potted plants placed in the flat are than watered through the holes in the bottoms of the pots by simply pouring a small quantity of water in the insert, and without drip, overflowing, or rotting the plants. To all the foregoing advantages in the growing of plants may be added that of increasing the life of the wooden flats themselves, particularly by saving rusting out of the nails and disintegration and splitting of the wood at the nail holes near the corners of the flats.

For the foregoing reasons and in view of my novel contribution to the art, I claim:

1. In combination with a wooden greenhouse flat, a flexible water-proofed paper insert covering the inside bottom area of said flat and extending partially up the inside walls of said flat and limiting the maximum water level in the soil in said flat to a depth of the order of $\frac{1}{2}''-\frac{3}{4}''$ and well below the exposed surface of said soil, a layer of gravel or broken stone forming a sub-irrigation means arranged on said insert, a body of seed soil of substantial depth for germinating seeds and growing small plants, arranged on said gravel, whereby a shallow water-tight medium adapted to retain a limited amount of moisture and prevent water leakage from the inside bottom zone of said soil is provided.

2. In combination with a wooden greenhouse flat, a creased flexible water-proofed paper insert folded on its creases and covering the inside bottom area of said flat and extending partially up the inside walls of said flat, thereby providing a shallow water tight medium adapted to retain a limited amount of moisture in and prevent water leakage from the inside bottom zone of the soil in the flat, a layer of gravel or broken stone forming a sub-irrigation means arranged on said insert, a body of seed soil of substantial depth for germinating seeds and growing small plants, arranged on said gravel, whereby a shallow water-tight medium adapted to retain a limited amount of moisture and prevent water leakage from the inside bottom zone of said soil is provided.

3. In combination with a wooden greenhouse flat, a creased water-proofed paper insert, providing an uncreased rectangular area substantially equal to the inside bottom area of said flat and covering said inside bottom area, said insert being folded on its creases to provide side portions extending partially up the inside walls of said flat, a layer of gravel or broken stone forming a sub-irrigation means arranged on said insert, a body of seed soil of substantial depth for germinating seeds and growing small plants, arranged on said gravel, whereby a shallow water-tight medium adapted to retain a limited amount of moisture and prevent water leakage from the inside bottom zone of said soil is provided.

4. In combination with a wooden greenhouse flat, a flexible water-proofed paper insert covering the inside bottom area of said flat and extending sufficiently up the inside walls of said flat to provide a water-retaining bottom portion and limiting the maximum water level in the soil in said flat to a depth well below the exposed surface of said soil, a layer of relatively firm sub-irrigation material arranged on and substantially covering the inside bottom area of said insert, a body of seed soil of substantial depth for germinating seeds and growing plants, arranged on and covering said layer of sub-irrigation material, whereby a shallow water-tight medium adapted to retain a limited amount of moisture and prevent water leakage from the inside bottom zone of said soil is provided.

LEO J. HEBERT.